(12) United States Patent
Crews

(10) Patent No.: US 7,084,093 B2
(45) Date of Patent: Aug. 1, 2006

(54) CATALYZED POLYOL GEL BREAKER COMPOSITIONS

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 333 days.

(21) Appl. No.: 10/627,391

(22) Filed: Jul. 25, 2003

(65) Prior Publication Data

US 2004/0019199 A1 Jan. 29, 2004

Related U.S. Application Data

(63) Continuation-in-part of application No. 09/900,343, filed on Jul. 3, 2001, now Pat. No. 6,617,285.

(51) Int. Cl.
*C09K 8/68* (2006.01)
*C09K 8/60* (2006.01)

(52) U.S. Cl. .............. 507/209; 507/211; 507/261; 507/266; 507/921; 516/113

(58) Field of Classification Search ......... 507/209, 507/211, 261, 266, 921; 516/113
See application file for complete search history.

(56) References Cited

U.S. PATENT DOCUMENTS

| | | | |
|---|---|---|---|
| 3,079,332 A | 2/1963 | Wyant | |
| 3,215,634 A | 11/1965 | Walker | |
| 3,345,556 A | 10/1967 | Foster | |
| 3,800,872 A | 4/1974 | Friedman | |
| 4,946,604 A | 8/1990 | Smith | |
| 5,067,566 A | 11/1991 | Dawson | |
| 5,082,579 A | 1/1992 | Dawson | |
| 5,143,157 A * | 9/1992 | Harms | 166/300 |
| 5,145,590 A | 9/1992 | Dawson | |
| 5,160,445 A | 11/1992 | Sharif | |
| 5,160,643 A | 11/1992 | Dawson | |
| 5,217,074 A * | 6/1993 | McDougall et al. | 166/300 |
| 5,247,995 A | 9/1993 | Tjon-Joe-Pin et al. | |
| 5,310,489 A | 5/1994 | Sharif | |
| 5,372,732 A | 12/1994 | Harris et al. | |
| 5,445,223 A * | 8/1995 | Nelson et al. | 166/308.5 |
| 5,460,226 A | 10/1995 | Lawson et al. | |
| 5,658,861 A | 8/1997 | Nelson et al. | |
| 5,827,804 A | 10/1998 | Harris et al. | |
| 5,877,127 A | 3/1999 | Card et al. | |
| 6,060,436 A | 5/2000 | Snyder et al. | |
| 6,063,737 A * | 5/2000 | Haberman et al. | 507/261 |
| 6,177,385 B1 | 1/2001 | Nimerick | |
| 6,511,654 B1 * | 1/2003 | Ibsen et al. | 424/49 |
| 6,617,285 B1 * | 9/2003 | Crews | 507/201 |
| 2003/0092581 A1 * | 5/2003 | Crews | 507/100 |
| 2003/0092584 A1 * | 5/2003 | Crews | 507/200 |
| 2003/0119678 A1 * | 6/2003 | Crews | 507/100 |
| 2003/0134751 A1 | 7/2003 | Lee et al. | |

OTHER PUBLICATIONS

H. Deuel, et al., "Reaction of Boric Acid with Polysaccharides," Nature, Jan. 17, 1948, pp. 96-97, vol. 161, No. 4081.
"Gelling Mud Slurry by Adding Polymer," Derwent/WPI Abstract, 1976-73139X/197639 to JP 51092508.
E.H. Ajandouz, et al., "Effects of pH on Caramelization and Maillard Reaction Kinetics in Fructose-Lysine Model Systems," J. Food Science, 2001, pp. 926-931, vol. 66, No. 7.
"Sugar Technology" Available from: http://www.geocities.com/bimbimbim88/sugar_technology.htm, Apr. 7, 2003.
C.G.A. Davies & T.P. Labuza, "The Maillard Reaction Application to Confectionary Products," pp. 1-33. Available from: http://www.fsci.umn.edu/Ted_Labuza/PDF_files/papers/maillard-confectionary.pdf, May 20, 2003.
Lehninger, "Chapter 9: Carbohydrates and Glycobiology," pp. 293-303. Available from: http://www.icb.ufmg.br/~lbcd/cromatina/Lehninger/lehn09.pdf, May 20, 2003.

* cited by examiner

*Primary Examiner*—Philip C. Tucker
(74) *Attorney, Agent, or Firm*—Madan, Mossman & Sriram PC

(57) ABSTRACT

It has been discovered that fracturing fluid breaker mechanisms are improved by the inclusion of a catalyzed polyol alone that directly degrades the polysaccharide backbone, and optionally additionally by removing the crosslinking ion, if present. That is, viscosity reduction (breaking) occurs by breaking down the chemical bonds within the backbone directly. The gel does not have to be crosslinked for the method of the invention to be successful, although it may be crosslinked. In one non-limiting embodiment, the polyol has at least two hydroxyl groups on adjacent carbon atoms. In another embodiment, the polyols are simple sugars and sugar alcohols, and may include mannitol, sorbitol, glucose, fructose, galactose, mannose, lactose, maltose, allose, etc. and mixtures thereof. The catalyzing metal ion may employ a metal selected from Groups VIB, VIIB, VIII, IB, and IIB of the Periodic Table (previous IUPAC American Group notation).

32 Claims, 8 Drawing Sheets

2.0 gptg Alkyl Glucoside Polyol Catalyzed By Metal Ions at 200 F In 30 pptg Borate Crosslinked Guar

CATALYZED POLYOL GEL BREAKER COMPOSITIONS

CROSS-REFERENCE TO RELATED APPLICATION

This application is a continuation-in-part application of U.S. patent application Ser. No. 09/900,343 filed Jul. 3, 2001, now U.S. Pat. No. 6,617,285.

FIELD OF THE INVENTION

The present invention relates to gelled treatment fluids used during hydrocarbon recovery operations, and more particularly relates, in one embodiment, to methods of "breaking" or reducing the viscosity of treatment fluids containing gelling agents used during hydrocarbon recovery operations.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity. One disadvantage of enzyme breakers is that they tend to be relatively expensive. Oxidizer breakers are relatively less expensive, but can be dangerous if not handled properly, and further have a technical gap of not being useful between about 160 to about 230° F. (about 71 to about 110° C.).

It would be desirable if a viscosity breaking system could be devised to break fracturing fluids gelled with borate crosslinked polymers by directly breaking down the polysaccharide backbone, whether or not the backbone is crosslinked.

SUMMARY OF THE INVENTION

Accordingly, it is an object of the present invention to provide a method for breaking the viscosity of polymer-gelled aqueous treatment fluids used in hydrocarbon recovery operations.

It is another object of the present invention to provide a composition and method for breaking polysaccharide gelled aqueous fluids by breaking down the polysaccharide backbone directly.

Still another object of the invention is to provide a method and composition for breaking the viscosity of aqueous fluids gelled with polymers that can provide better clean up of the crosslinked polymer.

In carrying out these and other objects of the invention, there is provided, in one embodiment of the invention a method for breaking viscosity of aqueous fluids gelled with polysaccharides that involves adding to an aqueous fluid gelled with at least one polysaccharide, at least one low molecular weight polyol. A metal ion is added to the aqueous fluid in an amount effective to catalyze the polyol to break down the polymer backbone directly. The metal ion may be employed on a catalyst substrate. The metal ion is selected from the Periodic Table Groups VIB, VIIB, VIIIB, IB and IIB. The sequence of addition of the polyol and the metal ion is not critical and they may be added together.

In other non-limiting embodiments of the invention, the methods and compositions for breaking the viscosity of aqueous fluids gelled with polysaccharides do not require lowering the pH of the fluid, and further do not require removing or sequestering any crosslinking ions, particularly any borate or other ions. However, crosslinking ions may be present, and the methods of the invention may coincidentally remove crosslinking ions from crosslinked polysaccharides. In another non-limiting embodiment of the invention, the methods and compositions do not require the use of an enzyme or an oxidizing breaker.

DETAILED DESCRIPTION OF THE INVENTION

Figure 1:
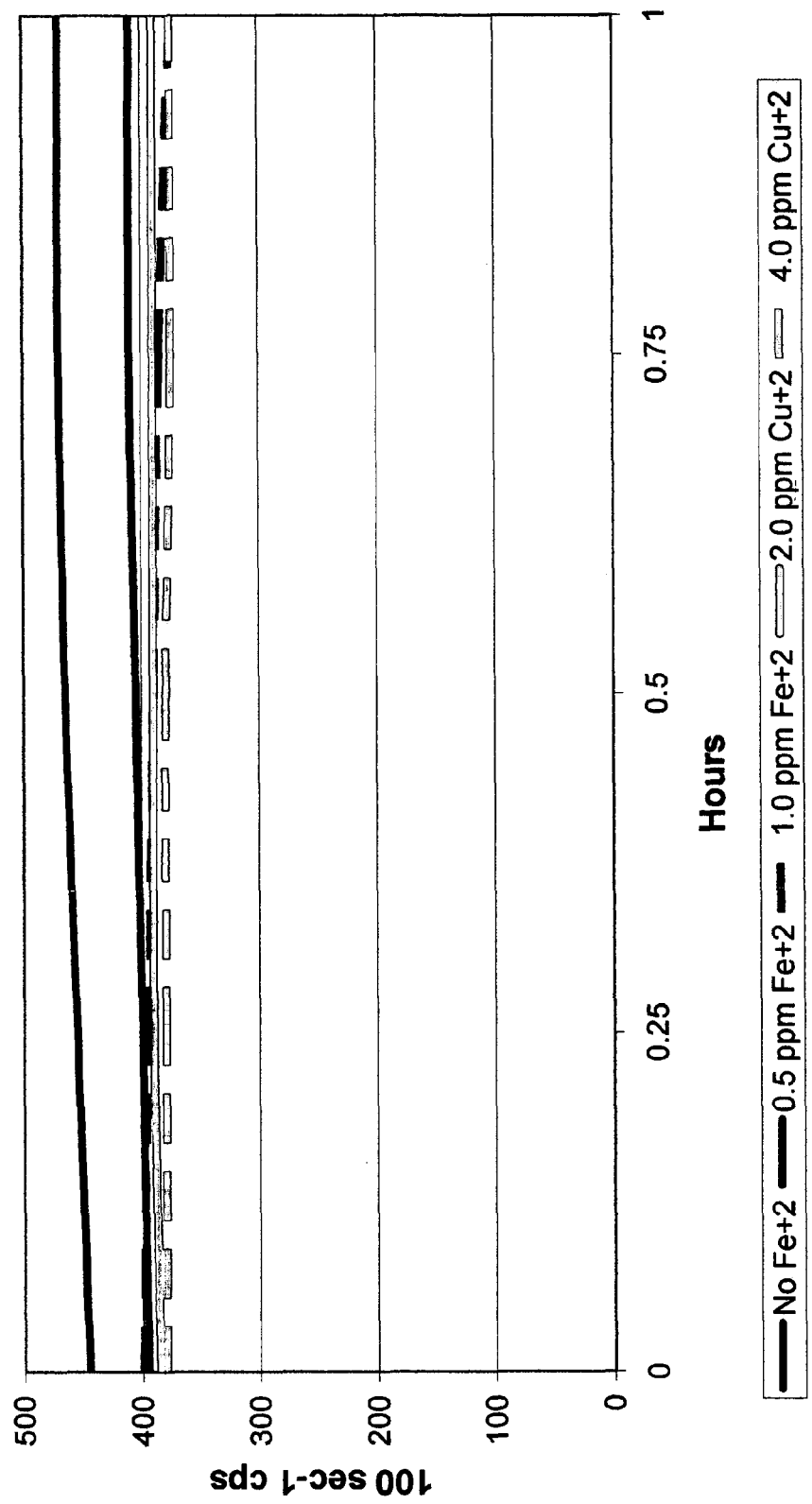
FIG. 1 is a graph of the effects of $Fe^{+2}$ and $Cu^{+2}$ at 200° F. (93° C.) in 30 pptg (3.6 kg/m$^3$) borate crosslinked guar, showing little breaking effect.

A unique fracturing fluid breaker mechanism in which the fracturing fluid's viscosity is reduced (or is "broken") by use of catalyzed polyols has been discovered. It is not necessary, and in some cases not desirable, for oxidizer or enzyme breakers to also be present in the methods of this invention. In the context of this invention, polymer degradation is dependent primarily on the type and amount of polyol, the type and amount of metal ion catalyst (and whether or not the catalyst is complexed or chelated), and fluid temperature. Other physical and chemical conditions also have a role in the breaking activity of the polyols on polysaccharide gelled fluids, including whether the polymer fluid is crosslinked (has a three dimensional structure), fluid pH, and whether there are present glycols, alcohols, amino acids, salinity, and the like, and in what proportion these other components are present and mixtures thereof.

The polyols of this invention are defined in one non-limiting embodiment as polyols having at least one hydroxyl group on two adjacent carbon atoms. The adjacent carbon atoms may have more than one hydroxyl group, and the polyol may have more that two adjacent carbon atoms, each having at least one hydroxyl group. In another embodiment of the invention, the polyols are simple sugars (e.g. mono and disaccharides such as glucose, fructose, lactose, maltose, etc.), sugar alcohols, (e.g. glycerol, sorbitol, xylitol, and mannitol), oligosaccharides, derivatives of sugar (e.g. alkyl glucosides, alkyl sorbitans, glucosamine, gluconate, etc.) and the like. In another embodiment of the invention, the polyols may have one of the following formulae:

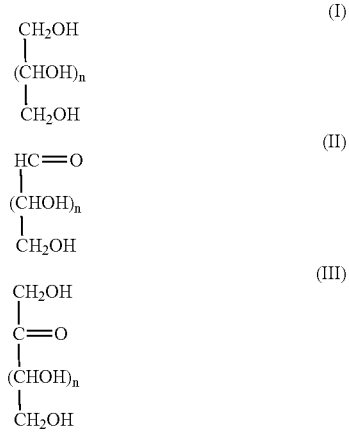

where n is from 2 to 5, and the hydroxyls may be in the cis or trans orientation. In another embodiment of the invention, the polyols are acids, acid salts, fatty acids (alkyl glycosides), and alcohol, alkyl and amine derivatives (glycosylamines) of monosaccharides and oligosaccharides. Specific examples of polyols falling within these definitions include, but are not necessarily limited to, mannitol (manna sugar, mannite), sorbitol (D-sorbite, hexahydric alcohol), xylitol, glycerol, glucose, (dextrose, grape sugar, corn sugar), fructose (fruit sugar, levulose), maltose, lactose, tagatose, psicose, galactose, xylose (wood sugar), allose (β-D-allopyranose), ribose, arabinose, rhamnose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethyl-hexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof. In one non-limiting embodiment of the invention, the molecular weight of the simple polyols may range from about 65 to about 500, where an alternate embodiment for the molecular weight ranges from about 90 to about 350. Useful oligosaccharides may have molecular weights ranging from about 450 to about 5000 in one non-limiting embodiment, with most ranging from about 480 to about 1000 in another non-limiting embodiment.

It will be appreciated that derivatives of these relatively simple polyols will also find use in the inventive methods and compositions. Suitable derivatives include, but are not necessarily limited to, acid, acid salt, alcohol, alkyl, and amine derivatives of these saccharides, and mixtures of polyols and/or the derivatives thereof. Specific examples of suitable derivatives include, but are not necessarily limited to, alkyl glucosides, alkyl polyglucosides, alkyl glucosamides, alkyl glucosamines, alkyl sorbitans, alkyl sorbitols, alkyl glucopyranosides, alkyl maltosides, alkyl glycerols and mixtures thereof. The alkyl groups of these derivatives may be C2 to C36 straight, branched, or cyclic alkyls.

The metal ion catalysts of this invention may employ metals from Groups VIB, VIIB, VIII, IB, and IIB of the Periodic Table (previous IUPAC American Group notation) in one non-limiting embodiment of the invention. In another non-limiting embodiment of the invention metal of the metal ion may be molybdenum, manganese, iron, cobalt, copper, zinc, chromium, nickel, palladium, and combinations thereof. The metal ions may be introduced as a part of other compounds, including, but not necessarily limited to, organometallic complexes with iron, copper, cobalt, manganese, etc.; metals in oxide, sulfate, carbonate, or phosphate compound form as finely ground particles; metal ions plated onto particles, such as proppants; metal ions dispersed within matrix or plated onto surface of zeolites, such as iron, cobalt or copper loaded ZSM-5; or metal ions attached to the surface of clays, such as smectite. The metal ions may also be part of an inorganic compound, such as in the forms described above or other compounds. The metal ions may also, in one non-limiting embodiment, be in an encapsulated or pelletized form as a method of delayed release of metal ions. Of course, in one non-limiting embodiment of the invention, the metal ions may be precomplexed or chelated with known chelates including, but not necessarily limited to, gluconate, glucoheptonate, organic acids including citric acid and the like and aminocarboxylic acids including ethylenediamineteteracetic acid (EDTA), nitrilotriacetic acid (NTA) and the like.

Only trace amounts of the metal ion catalysts are required. Typical metal ion concentrations may range from about 0.01 to about 100.0 ppm, and in another non-limiting embodiment from about 0.1 to about 10.0 ppm.

The use of simple sugars, acid sugars, acid sugar salts, alcohol sugars, alkyl glycosides, and glycosylamines to complex or chelate borate ions of the gelled polysaccharides lowers the pH of the borate crosslinked fluid (if the fluid is borate-crosslinked) and thus its viscosity.

Further, the amounts of polyols used in the method of this invention are lower than those used in the prior art where some of such polyols are used to delay gelling in the first place. In non-limiting embodiments, the amounts of polyols used in the methods of this invention may be up to one-twentieth (1/20) as low as what has been previously used. In the catalyzed polyol invention herein, the amounts of polyols used are even lower. Further, the use of the catalyzed polyols of this invention permit the breaking of gels over a wider temperature range than is possible with some prior art methods. The catalyzed polyols of this invention may be used from about 80° F. (27° C.) up to about 260° F. (127° C.), in another non-limiting embodiment of this invention the polyols may be used in the range of from about 160 to about 230° F. (about 71 to about 110° C.).

Once the pH starts to be lowered through the prescribed mechanism of liberating the borate ions from the gel by the polyols, breaking (viscosity reduction) occurs by uncrosslinking of the fracturing fluid, and by liberating the crosslinking ion, e.g. borate as well, if present. In general, the lower that the pH shifts through the use of a borate ion sequestering product, the more effective and complete the above-listed breaking mechanisms can be. In other words, because more than one mechanism is used in some cases, a more complete break may be obtained. Complete borate uncrosslinking and up to 80 to near-100 percent backbone reduction (polysaccharide chain degradation) can be achieved with the selection and proper use of a catalyzed polyol breaker.

It will be appreciated that breaking of the gel by reducing the pH of the fluid and removing at least a portion of the borate ion (if present) from the crosslinked polymer and attacking the polysaccharide backbone directly do not happen instantaneously or when the metal ion and the polyol are added to the fluid, nor should it. Rather, these mechanisms act over time or eventually. This time delay is necessary to complete the fracturing portion of the operation and the optional setting of the proppant. The time delay will also vary depending on the particular requirements of each individual fracturing job and cannot be specified in advance.

A value of the invention is that a fracturing fluid can be designed to have enhanced breaking characteristics. Importantly, better clean-up of the crosslinked polymer from the fracture and wellbore can be achieved thereby. Better clean-up of the polymer directly influences the success of the fracture treatment, which is an enhancement of the well's hydrocarbon productivity.

Most conventional borate crosslinked fracturing fluids and breakers are designed from a fixed crosslinked fluid pH value at ambient and/or reservoir temperature. By having products that can lower the pH of the fracturing fluid at reservoir temperature, such as the materials of the invention, the breaking of the fluid can be enhanced beyond existing conventional materials or methods for fracturing. The result is more enhanced breaking of the fracturing fluid over conventional materials and methods, which gives better clean-up of the crosslinked polymer from the fracture and wellbore.

One advantage of the catalyzed polyol breakers of this invention is that they have little, if any toxicity or environmental concerns, and thus, are safer to ship, handle and use as compared with some alternative breakers. The polyol breakers of this invention have another advantage of being relatively less expensive than conventional enzyme breakers. Oxidizer breakers are also relatively inexpensive, but they have a technical gap of not being useful from about 160 to about 230° F. (about 71 to about 110° C.).

In order to practice the method of the invention, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time sufficient to form a hydrated solution. The hydratable polymer that is useful in the present invention can be any of the hydratable polysaccharides having galactose or mannose monomer units and are familiar to those in the well service industry. These polysaccharides are capable of gelling in the presence of a crosslinking agent to form a gelled base fluid. For instance, suitable hydratable polysaccharides are the galactomannan gums, guars and derivatized guars. Specific examples are guar gum and guar gum derivatives. The preferred gelling agents are guar gum, hydroxypropyl guar and carboxymethyl hydroxypropyl guar. The most preferred hydratable polymers for the present invention are guar gum and carboxymethyl hydroxypropyl guar and hydroxypropyl guar.

The amount of polysaccharide included in the fracturing fluid is not particularly critical so long as the viscosity of the fluid is sufficiently high to keep the proppant particles suspended therein during the fluid injecting step. Thus, depending on the application, the hydratable polymer is added to the aqueous fluid in concentrations ranging from about 15 to 60 pounds per thousand gallons (pptg) by volume of the total aqueous fluid (1.8 to 7.2 kg/m$^3$). The most preferred range for the present invention is about 20 to about 40 pptg (2.4 to 4.8 kg/m$^3$).

In addition to the hydratable polymer, the fracturing fluids of the invention may optionally include a crosslinking agent, such as a borate crosslinking agent. The crosslinking agent can be any of the conventionally used borate crosslinking agents that are known to those skilled in the art. This includes any of the boron salts or boric acid as borate crosslinking agents. Guar and derivatized guar gels, which are crosslinked by the addition of borate ion donating materials, are preferred within this embodiment over other crosslinking agents because they clean up faster and yield higher sand pack permeability than guar gels crosslinked with other crosslinking agents. However, other crosslinking agents can be used with this embodiment besides borate, which may include, but are not limited to, titanates, zirconates, and other metallic and semi-metallic crosslinkers.

In the case of borate crosslinkers, the crosslinking agent is any material that supplies borate ions into solution. The amount of borate ions in solution is dependent on pH. Thus, the crosslinking agent can be any convenient source of borate ions, for instance the alkali metal and the alkaline earth metal borates and boric acid. A preferred crosslinking additive is preferably a common type of borax present in the range from about 0.25 to in excess of 10.0 pptg of the total aqueous fluid (0.03 to in excess of 1.2 kg/m$^3$). Preferably, the concentration of crosslinking agent is in the range from about 1.0 to about 3.0 pptg (0.12 to 0.34 kg/m$^3$) by volume of the total aqueous fluid.

Propping agents are typically added to the base fluid just prior to the addition of the crosslinking agent. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120–1700 kg/m$^3$) of fracturing fluid composition, but higher or lower concentrations can be used as the fracture design requires. The base fluid can also contain other conventional additives common to the well service industry such as surfactants, biocides, non-emulsifiers and the like.

In one non-limiting embodiment of the invention, the suitable polyol materials for use in the invention include those described above, such as monosaccharides, oligosaccharides, and their acid, acid salt, alcohol, alkyl, and amine derivatives, in one non-limiting embodiment of the invention. In a different preferred embodiment, polyols of formulae (I), (II), and (III), are preferred in another non-limiting embodiment of the invention.

Any or all of the above polyol materials may be provided in an extended release form such as encapsulation by polymer or otherwise, pelletization with binder compounds, absorbed on a porous substrate, and a combination thereof. Specifically, the materials may be encapsulated to permit slow or timed release of the polyol materials. In non-limiting examples, the coating material may slowly dissolve or be removed by any conventional mechanism, or the coating could have very small holes or perforations therein for the material within to diffuse through slowly. For instance, polymer encapsulation coatings such as used in fertilizer technology available from Scotts Company, specifically POLY-S® product coating technology, or polymer encapsulation coating technology from Fritz Industries could possibly be adapted to the methods of this invention.

It is difficult, if not impossible, to specify with accuracy the amount of the polyol that should be added to a particular aqueous fluid gelled with borate crosslinked polymers to fully break the gel, in general. For instance, a number of factors affect this proportion, including but not necessarily limited to, the particular polymer used to gel the fluid; the particular polyol used to break the gel; the temperature of the fluid; the starting pH of the fluid; the nature and the concentration of the pH buffers; and the complex interaction of these various factors. Nevertheless, in order to give an approximate feel for the proportions of the polyol to be used in the method of the invention, the amount of material added may range from about 0.1 to about 30.0 pptg (about 0.012 to about 3.6 kg/m$^3$), based on the total weight of the fluid; preferably from about 0.5 to about 30.0 pptg (about 0.06 to about 3.4 kg/m$^3$); most preferably from about 1.0 to about 20.0 pptg (about 0.12 to about 2.4 kg/m$^3$). However, in the catalyzed polyol embodiment of the invention, the amount of polyol can be lowered even further, to between about 0.1 to about 10 pptg (about 0.012 to about 1.2 kg/m$^3$) based on the total volume of fluid, and between about 0.5 to about 10 pptg (about 0.06 to about 1.2 kg/m$^3$) in an alternate embodiment of the invention.

It will be appreciated that in some embodiments of the invention, the amount of polyol necessary to break a particular polysaccharide-gelled aqueous fluid will depend upon the particular polyol used.

It is necessary, in some embodiments, to add pH buffers to the gelled aqueous fluid to increase the pH to generate active borate ion for crosslinking the polymers. Suitable buffers include, but are not necessarily limited to sodium hydroxide, potassium hydroxide, sodium carbonate, sodium sesquicarbonate, potassium carbonate, sodium bicarbonate, and mixtures thereof. The amount of the pH buffer may range from about 0.5 to about 30.0 pptg (about 0.06 to about 3.6 kg/m$^3$), based on the total volume of the entire fluid, preferably from about 1 to about 20 pptg (about 0.12 to about 2.4 kg/m$^3$).

In a typical fracturing operation, the fracturing fluid of the invention is pumped at a rate sufficient to initiate and propagate a fracture in the formation and to place propping agents into the fracture. A typical fracturing treatment would be conducted by hydrating a 20 lb to 30 lb/1000 gal water (weight/volume) (about 2.4 to about 3.6 kg/m$^3$) glactomannan-based polymer, such as guar, in a 2% (w/v) (166 lb/1000 gal (19.9 kg/m$^3$)) KCl solution at a pH ranging from about 6.0 to about 8.0. For crosslinking this pH range may be from about 8.8 to about 10.5. The polyol is added at this stage. It should be understood throughout the specification and claims that more than one polyol may be employed at a time. During the actual pumping, as described, the pH of the ambient temperature guar gel is raised by the addition of a buffer to about 9.5 to about 12.5, followed by the addition of the crosslinking agent, proppant, and other additives, if required.

The present invention will be explained in further detail in the following non-limiting Examples that are only designed to additionally illustrate the invention but not narrow the scope thereof.

General Procedure for Examples

Using a Waring blender, 4.8 mls of Drilling Specialties Slurry Guar (guar gum slurried in a glycol ether based fluid suspension) was hydrated for 15 minutes within 500 mls of distilled water containing 10 grams KCl salt. This first fluid mix was then poured into a 500 ml wide mouth Nalgene plastic bottle and labeled fluid No.1. A second fluid was mixed for 15 minutes as listed above and then 1.0 ppm Fe$^{+2}$ was added (0.5 mls from a solution of 0.227% bw FeCl$_2$ in Dl water) and mixed for an additional 1 minute on the Waring blender. The second fluid was then poured into a 500 ml wide mouth Nalgene plastic bottle and labeled No.2. A third fluid was mixed for 15 minutes as listed above, and then 0.045 grams of alpha D-glucose (0.75 pptg glucose) was added to the hydrate guar fluid and mixed an additional 1 minute on the Waring blender. The third fluid was then poured into a 500 ml wide mouth Nalgene plastic bottle and labeled fluid No.3. A fourth fluid was mixed for 15 minutes as listed above, and 0.045 grams of alpha D-glucose (0.75 pptg glucose) along with 1.0 ppm Fe$^{+2}$ was added (0.5 mls from a solution of 0.227% bw FeCl$_2$ in Dl water) and mixed for an additional 1 minute on the Waring blender. The fourth fluid was then poured into a 500 ml wide-mouth Nalgene plastic bottle and labeled No.4. Then 1.0 mls of a 47% bw/bw K$_2$CO$_3$ solution was added to each of the fluid samples, and each sample was capped and shaken vigorously for 60 seconds. Next 1.2 mls of borate crosslinker (from Benchmark Research) was added to fluid No. 1 and was then quickly capped and shaken vigorously for 60 seconds. 1.2 mls of borate crosslinker was then added to fluid No.2 and was then quickly capped and shaken vigorously for 60 seconds. 1.2 mls of borate crosslinker was then added to fluid No.3 and was then quickly capped and shaken vigorously for 60 seconds. 1.2 mls of borate crosslinker was then added to fluid No.4 and was then quickly capped and shaken vigorously for 60 seconds. The samples were immediately placed in a pre-heated water bath at 200° F. (93° C.) and visually observed every 15 minutes for viscosity reduction difference between the samples over a two hour period.

Not all components were added in order to determine the breaking effects with just certain components alone. As will be seen, sample No. 2 with only the metal ions did not give much gel breaking, if any, during the first two hour period in the 200° F. (93° C.) water bath, and is comparable to sample No. 1 which does not have metal ions or polyol present. Sample No.3 with polyol (e.g. 0.75 pptg glucose) lost viscosity noticeably faster during the first two hour period in the 200° F. water bath. However, the use of metal ions together with polyols, fluid sample No.4, lost viscosity even faster than when polyols were used alone (fluid sample No.3) indicating a catalytic mechanism, and at least a synergistic effect. Most gel breaking that resulted in fluid sample No.4 occurred over the first hour.

FIGS. 1–2

Figure 2:
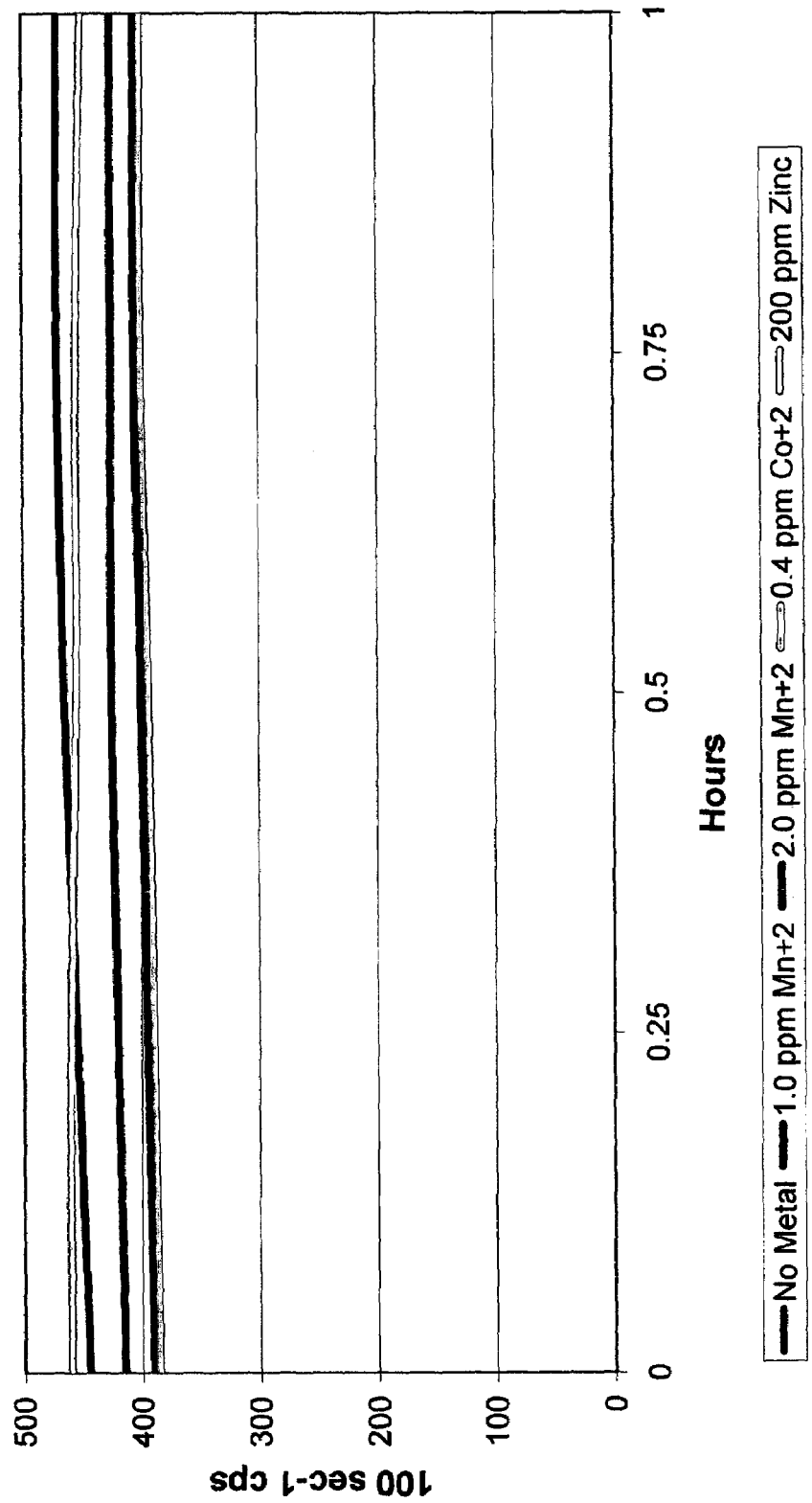
FIG. 2 is a graph of the effects of $Mn^{+2}$, $Co^{+2}$ and $Zn^{+2}$ at 200° F. (93° C.) in 30 pptg (3.6 kg/m$^3$) borate crosslinked guar, showing little breaking effect.

FIGS. 1 and 2 demonstrate the effects of using only the metal cations to break 30 pptg (3.6 kg/m$^3$) borate crosslinked guar, without using any polyol, at various cation concentrations. FIG. 1 presents the results for $Fe^{+2}$ and $Cu^{+2}$, where FIG. 2 presents the results for $Mn^{+2}$, $Co^{+2}$, and $Zn^{+2}$. As can be seen, while some breaking occurred, it was generally not significant. In the case of 200 ppm $Zn^{+2}$, essentially no breaking occurred.

FIGS. 3–5

Figure 3:
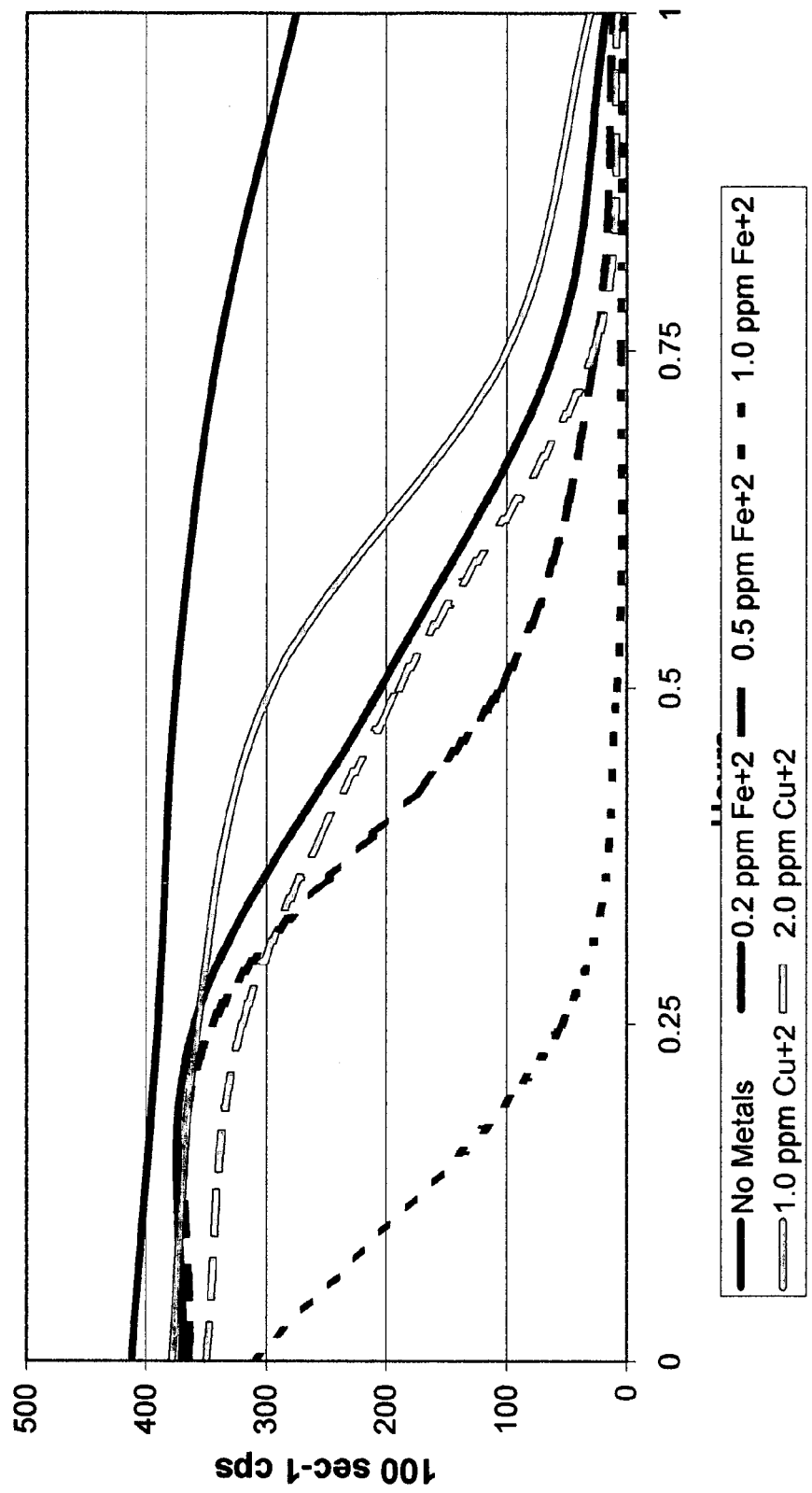
FIG. 3 is a graph of the results of 0.5 pptg (0.06 kg/m$^3$) glucose polyol catalyzed by $Fe^{+2}$ and $Cu^{+2}$ at various concentrations at 200° F. (93° C.) in 30 pptg borate crosslinked guar, showing pronounced breaking effect.
Figure 4:
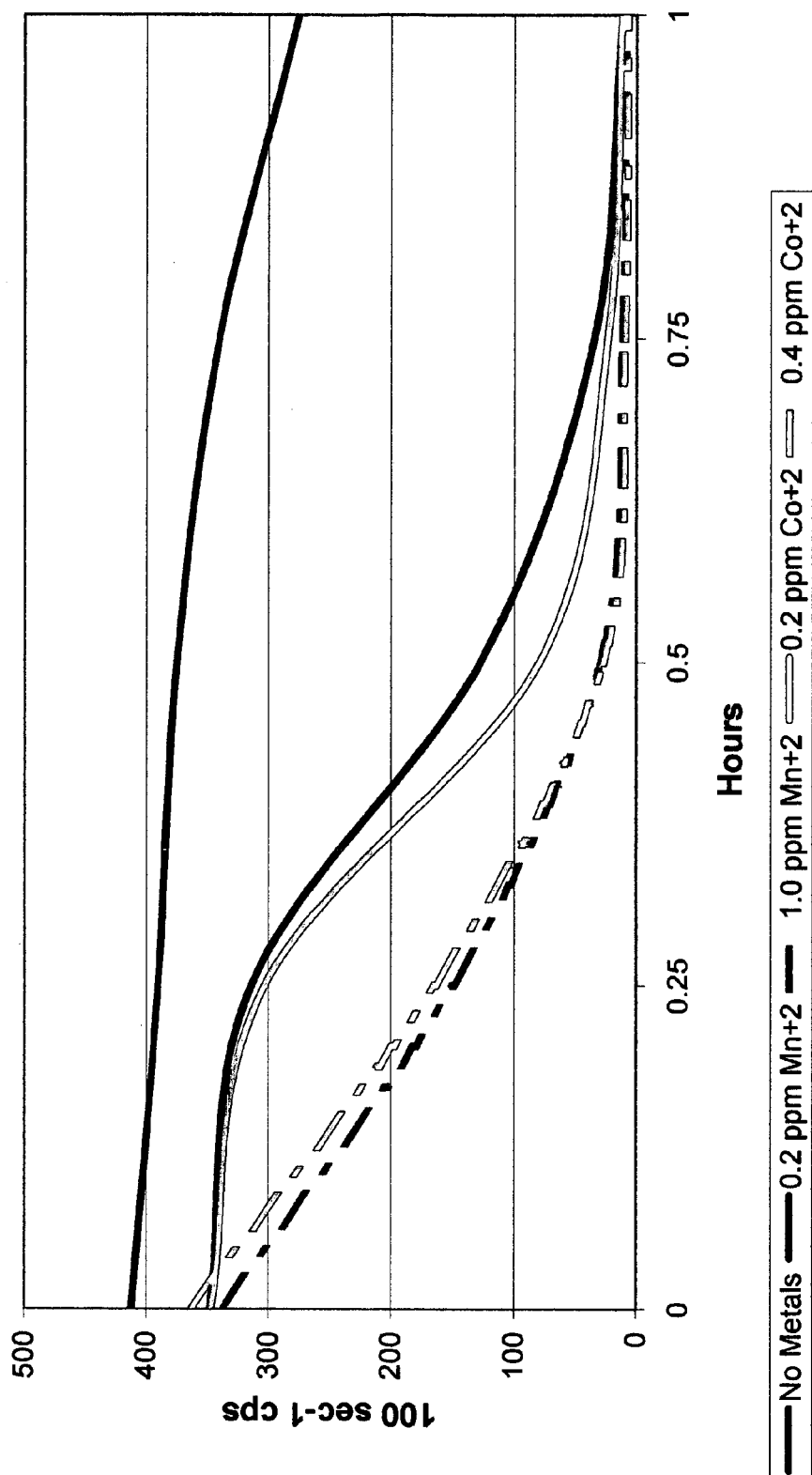
FIG. 4 is a graph of the results of 0.5 pptg (0.06 kg/m$^3$) glucose polyol catalyzed by $Mn^{+2}$ and $Co^{+2}$ at various concentrations at 200° F. (93° C.) in 30 pptg borate crosslinked guar, showing pronounced breaking effect.
Figure 5:
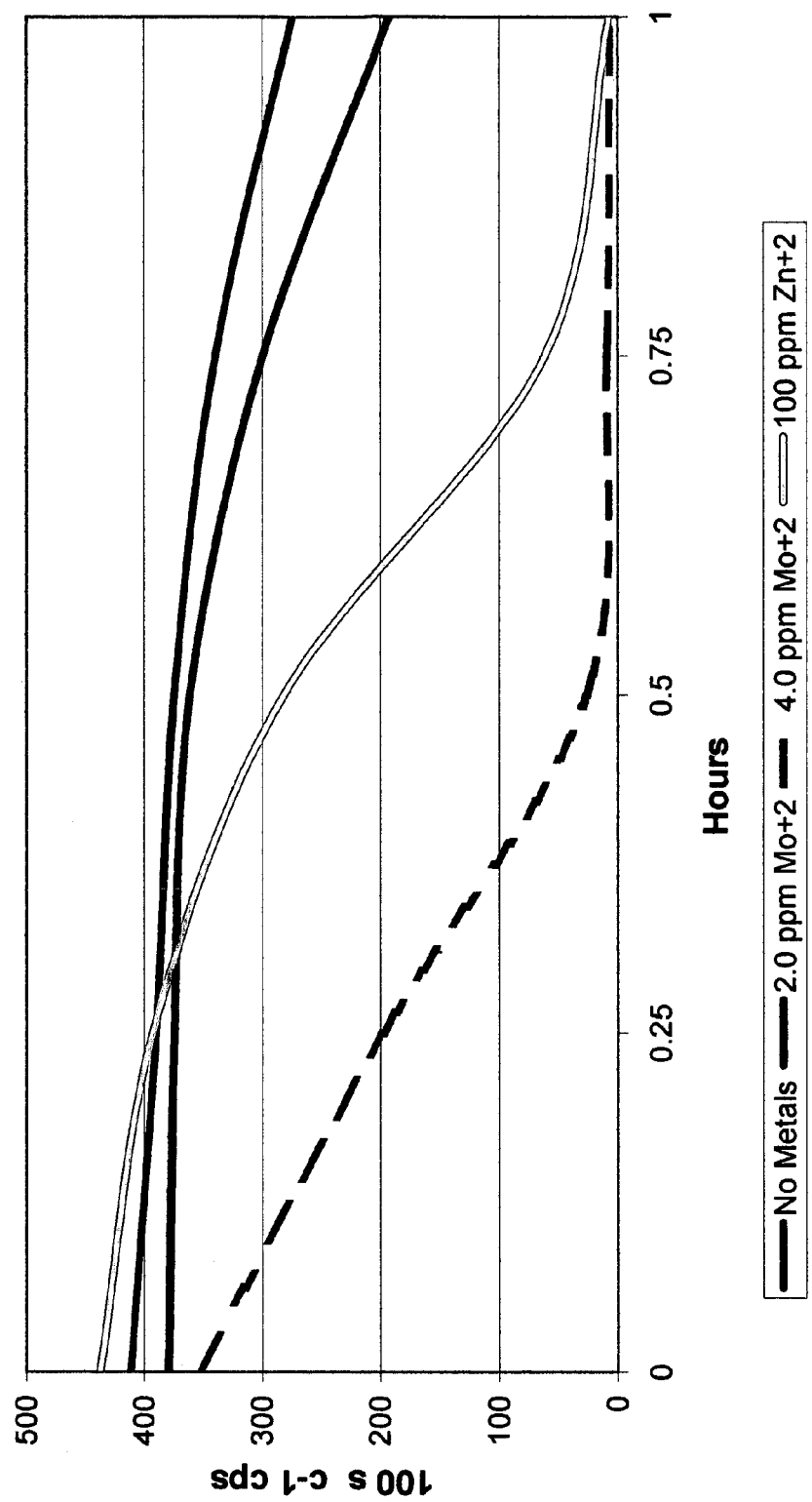
FIG. 5 is a graph of the results of 0.5 pptg (0.06 kg/m$^3$) glucose polyol catalyzed by $Mo^{+2}$ and $Zn^{+2}$ at various concentrations at 200° F. (93° C.) in 30 pptg borate crosslinked guar, showing pronounced breaking effect.

FIGS. 3, 4 and 5 demonstrate the effects of using the same metal cations to break 30 pptg (3.6 kg/m$^3$) borate crosslinked guar, but in conjunction with glucose polyol, at various cation concentrations. The topmost curve in each FIG. represents the case where no metal ion is used and while some breaking occurs, it is not very rapid. FIG. 3 presents the results for $Fe^{+2}$ and $Cu^{+2}$, and it may be seen that both metal ions are very effective, and that as the amount of metal ion increases, the gel breaks faster. FIG. 4 presents the results for $Mn^{+2}$ and $Co^{+2}$, and similar results are seen in that the use of the metal ions greatly increased the gel breaking, and the gel breaking accelerated with increasing amounts of metal ion. FIG. 5 shows similar results for $Mo^{+2}$ and $Zn^{+2}$, although 4.0 ppm $Mo^{+2}$ gave a much more dramatic result than did 2.0 ppm $Mo^{+2}$. The use of 100 $Zn^{+2}$ provided greatly improved breaking as compared with twice that amount when no glucose polyol was used in FIG. 2.

FIGS. 6–7

Figure 6:
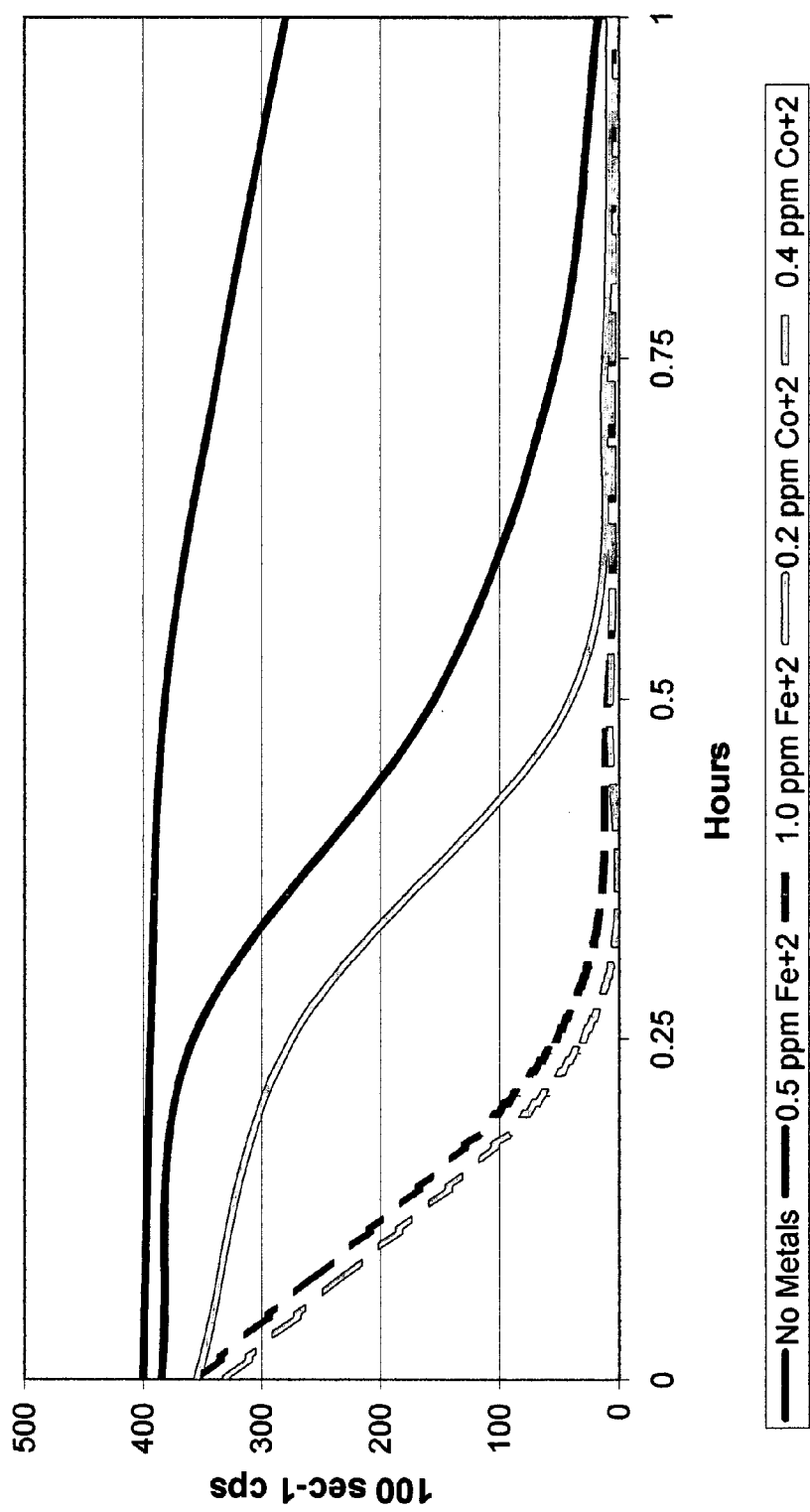
FIG. 6 is a graph of the results of 0.5 pptg (0.06 kg/m$^3$) alpha-lactose polyol catalyzed by $Fe^{+2}$ and $Co^{+2}$ at various concentrations at 200° F. (93° C.) in 30 pptg borate crosslinked guar, showing pronounced breaking effect.
Figure 7:
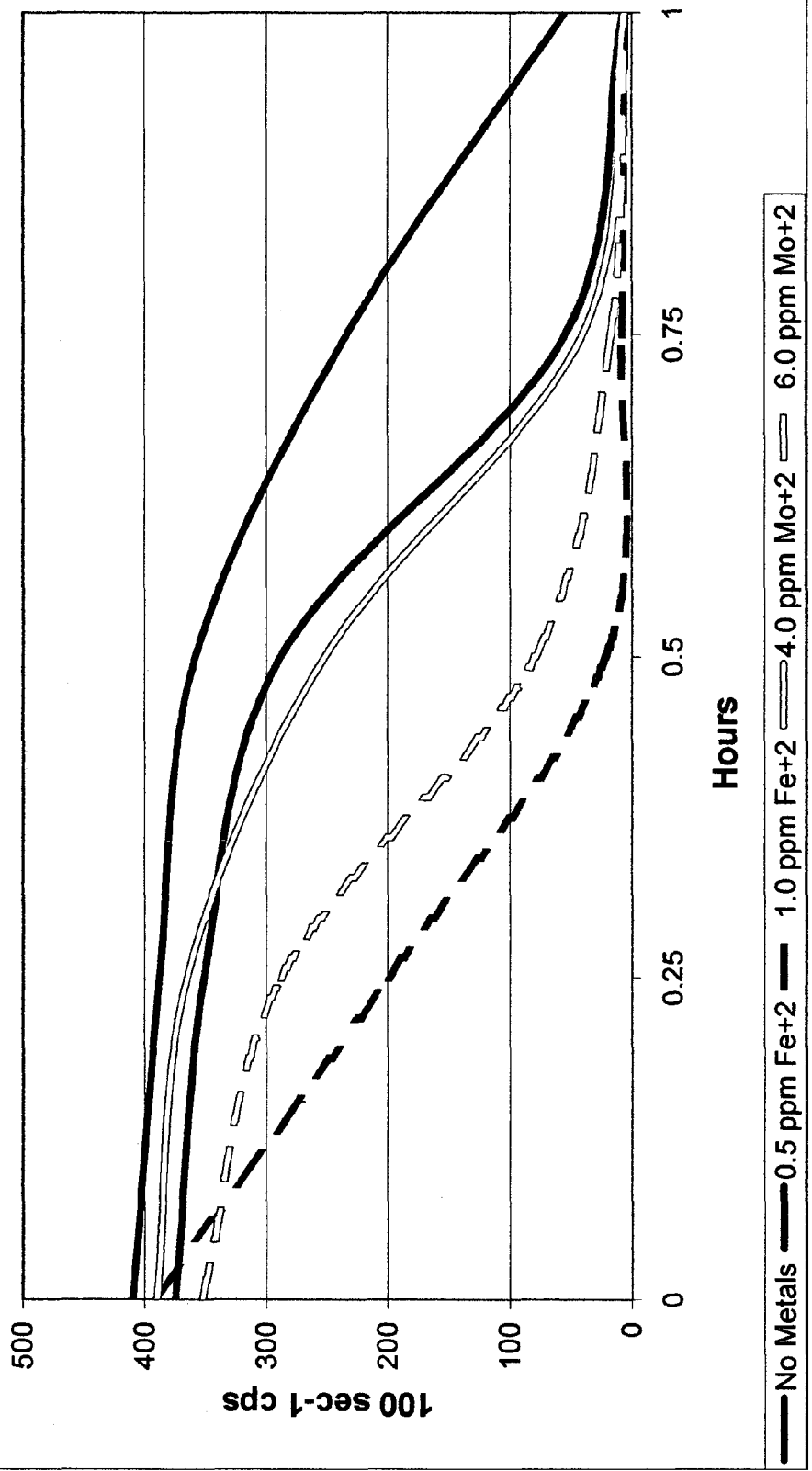
FIG. 7 is a graph of the results of 1.0 pptg (0.12 kg/m³) alpha-lactose polyol catalyzed by $Fe^{+2}$ and $Mo^{+2}$ at various concentrations at 200° F. (93° C.) in 30 pptg borate crosslinked hydroxypropyl guar, showing pronounced breaking effect.

FIGS. 6 and 7 demonstrate the effects of using the metal cations $Fe^{+2}$, $Co^{+2}$ and $Mo^{+2}$ to break 30 pptg (3.6 kg/m$^3$) borate crosslinked guar, but in conjunction with alpha-lactose polyol, at various cation concentrations. Note that the guar used in FIG. 7 was hydroxypropyl guar. The topmost curve in each FIG. represents the case where no metal ion is used and while some breaking occurs, it is not very rapid. FIG. 6 presents the results for $Fe^{+2}$ and $Co^{+2}$, and again it may be seen that both metal ions greatly increased the gel breaking, and that as the amount of metal ion increases, the gel breaks faster. FIG. 7 presents the results for $Fe^{+2}$ and $Mo^{+2}$, and similar results are seen in that the use of the metal ions was, and the gel breaking accelerated with increasing amounts of metal ion.

FIG. 8

Figure 8:
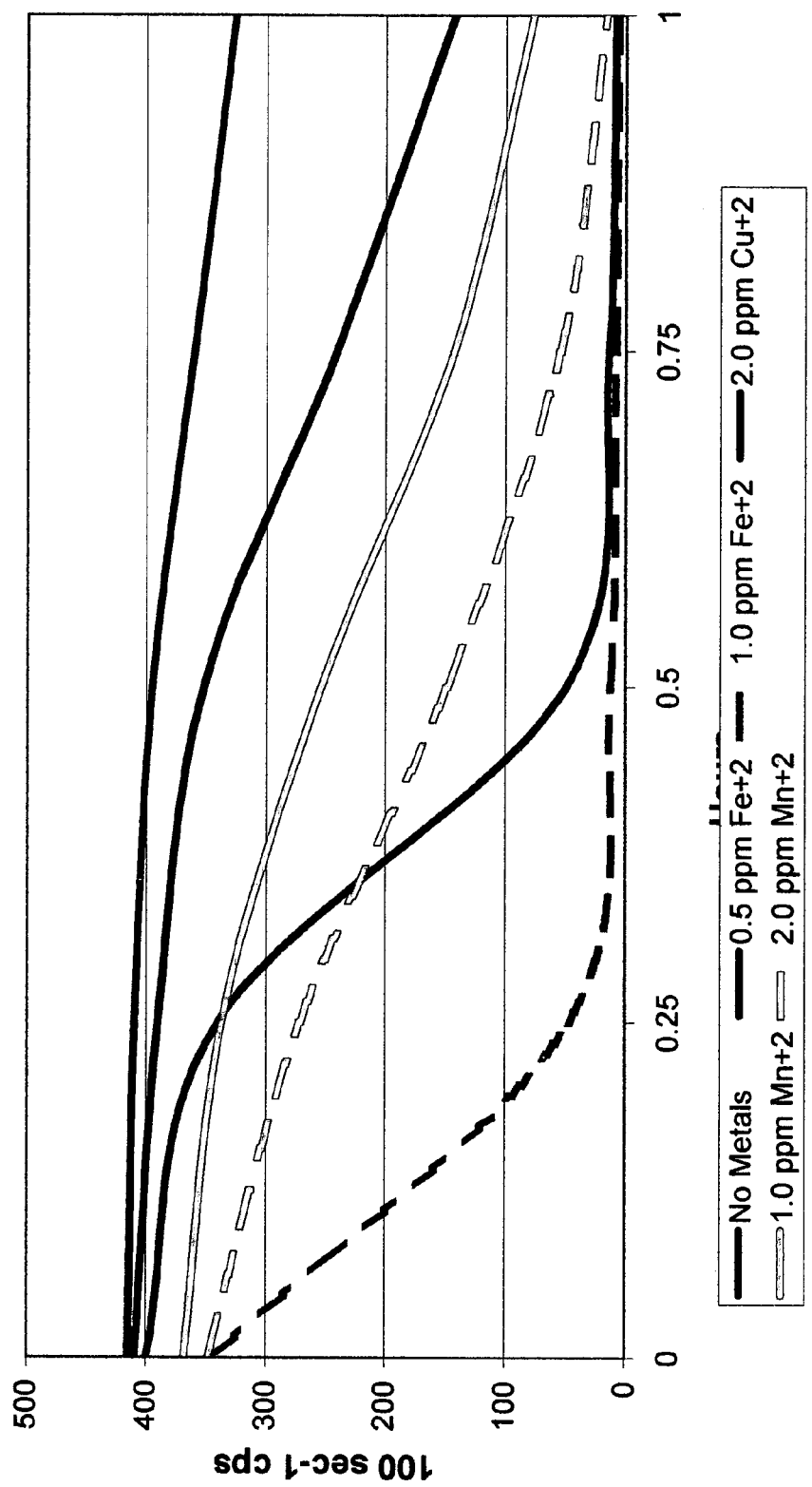
FIG. 8 is a graph of the results of 2.0 pptg (0.24 kg/m³) alkyl glucoside polyol catalyzed by $Fe^{+2}$, $Cu^{+2}$ and $Mn^{+2}$ at various concentrations at 200° F. (93° C.) in 30 pptg borate crosslinked guar, showing pronounced breaking effect.

FIG. 8 demonstrates the effects of using the metal cations $Fe^{+2}$, $Cu^{+2}$ and $Mn^{+2}$ to break 30 pptg (3.6 kg/m$^3$) borate crosslinked guar, but in conjunction with alkyl glucoside polyol, at various cation concentrations. Again, the topmost curve represents the case where no metal ion is used and while some breaking occurs, it is not very rapid. It may again be noticed that the use of metal ions catalyzes the breaking reaction, and that increasing amounts of metal ion accelerates the breaking. Divalent iron ion consistently provides some of the most rapid gel breaking over all of the Figures.

Besides metal ions other chemical components may influence the catalyzed polyol activity. Components such as ethylene glycol and ethanol, if present in the fluid may interact negatively with the catalyzed polyol breaking process. At low concentration, glycols or alcohols will slow down the catalyzed polyol breaking activity and at high concentrations they can significantly decrease the polyol breaking activity (polymer degradation over time). Oxidizers, such as sodium persulfate and sodium bromate, may also slow the catalyzed polyol breaking activity with borate crosslinked guar.

It is additionally expected that the presence of amine compounds may influence the catalyzed polyol breaking activity with borate crosslinked guar fluids. Specific to amine species and concentration used, some amines slow the polyol activity and some enhance the polyol breaking activity. Amines such as sodium iminodisuccinate and pentasodium diethylenetriaminepentaacetate may slow the polyol activity, and amines such as glycine and lysine may enhance the polyol breaking activity with borate crosslinked guar. If the metal ions are chelated with an amino carboxylic acid, or their salts, then only trace amount of amino carboxylic acid is suggested (such as less than 200 ppm) in order to not noticeably influence or negate the metal ion catalyzing activity with the polyol.

Among other items, the type and amount of pH buffer may also play an important role on the polyol activity. It appears that sodium hydroxide, and other hydroxide pH buffers, may reduce the catalyzed polyol breaking activity with polysaccharide gelled fluids. Polyol breaking activity may be enhanced by the co-use of alkali metal hydroxides together with carbonate pH buffers. Use of carbonate pH buffers, such as potassium carbonate, sodium sesquicarbonate, sodium bicarbonate, and other carbonate pH buffers may enhance or increase the polyol breaking activity with polysaccharides. Other compounds than what have been listed, which can control fluid pH or chemically alter the catalyzed polyol activity of breaking a polysaccharide polymer, especially at fluid temperatures of >120° F. (49° C.), may be present in the fluid and have utility to optimize breaking activity.

The catalyzed polyol breaker technology of this invention provides a number of advantages. The use of the metal ion catalysts widens the temperature application of polyol breaker technology. This technology lowers the cost of breaking gels, providing savings in hydrocarbon recovery operations using fracturing fluids. Further, the use of polyols in general and iron and manganese in trace amounts of less than 5.0 ppm provides an environmentally friendly breaker technology. A particular, non-limiting embodiment of an environmentally friendly system would be about 2 to about 5 ppm iron with 5.0 pptg (0.6 kg/m$^3$) glucose at 150° F. (66° C.). Additionally, the use of catalyzed polyol breaker technology of this invention is operationally friendly and safe to use.

In the foregoing specification, the invention has been described with reference to specific embodiments thereof, and has been demonstrated as effective in providing a method and composition for breaking polymer gelled fracturing fluids with catalyzed polyols that breakdown the polysaccharide backbone directly. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of polymers, optional crosslinkers, buffers, polyols, metal ion catalysts, methods of employing metal catalysts, and other components falling within the claimed parameters, but not specifically identified or tried in a particular composition, are anticipated and expected to be within the scope of this invention.

I claim:

1. A method for breaking viscosity of aqueous fluids gelled with polysaccharides comprising
    adding to an aqueous fluid gelled with at least one polysaccharide, at least one low molecular weight polyol;
    adding to the aqueous fluid in any sequence an effective amount of a metal ion to catalyze the polyol to break down the polymer backbone directly, where the metal ion is selected from the Periodic Table Groups VIB, VIIB, VIII, IB and IIB, where the metal ion is selected from the group consisting of:
    metal ions chelated or complexed prior to adding;
    metal ions that are a component of organometallic complexes;
    metals in oxide, sulphate, or phosphate form;
    metal ions plated onto particle surfaces;
    metal ions dispersed within a matrix;
    metal ions distributed within a synthetic porous particle;
    encapsulated or pelletized metal ions; and
    metal ions attached to the surface of clays; and
    in the absence of an oxidizer breaker.

2. The method of claim 1 where in adding the polyol, the polyol has at least one hydroxyl group on two adjacent carbon atoms and is selected from the group consisting of monosaccharides and disaccharides, and acid, acid salt, alcohol, alkyl and amine derivatives of these saccharides.

3. The method of claim 1 conducted in the absence of an enzyme breaker.

4. The method of claim 1 further comprising raising the pH of the aqueous fluid.

5. The method of claim 4 where the pH of the aqueous fluid is raised with a compound selected from the group consisting of an alkali metal hydroxide, alkali metal carbonate, bicarbonate, sesquicarbonate, and mixtures thereof.

6. The method of claim 1 where in adding the polyol, the polyol is selected from the group consisting of mannitol, sorbitol, xylitol, glycerol, glucose, fructose, maltose, lactose, tagatose, psicose, galactose, xylose, allose, ribose, arabinose, rhamnose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethylhexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof.

7. The method of claim 1 where in adding the polyol, the amount of polyol added ranges from about 0.1 to about 30.0 pptg (about 0.012 to about 3.6 kg/m$^3$) based on the total volume of fluid.

8. The method of claim 1 further comprising subjecting the polymer and the polyol to heat, where the temperature ranges from about 80 to about 250° F. (about 27 to about 121° C.).

9. The method of claim 1 where in subjecting the polymer and the polyol to heat for an effective period of time, the period of time ranges from about 0.5 to about 48 hours.

10. The method of claim 1 where the metal of the metal ion is selected from the group consisting of molybdenum, manganese, iron, cobalt, copper, zinc, chromium, nickel, palladium, and combinations thereof.

11. The method of claim 1 where the metal ion concentration in the aqueous fluid ranges from about 0.01 to about 100.0 ppm.

12. The method of claim 1 where the metal ion is a component of an inorganic compound.

13. The method of claim 1 where the polysaccharide is crosslinked.

14. The method of claim 13 where the polysaccharide is crosslinked with an ion selected from the group consisting of borate ion, zirconate ion, titanate ion, and combinations thereof.

15. A method for breaking viscosity of aqueous fluids gelled with polysaccharides comprising
    adding to an aqueous fluid gelled with at least one polysaccharide, at least one low molecular weight polyol, where the polyol has at least one hydroxyl group on two adjacent carbon atoms and is selected from the group consisting of monosaccharides and disaccharides, and acid, acid salt, alcohol, alkyl and amine derivatives of these saccharides, where the amount of polyol ranges from about 0.1 to about 30.0 pptg (about 0.012 to about 3.6 kg/m$^3$) based on the total volume of fluid;
    adding to the aqueous fluid in any sequence an effective amount of a metal ion to catalyze the polyol to break down the polymer backbone directly, where the metal ion is selected from the Periodic Table Groups VIB, VIIB, VIII, IB and IIB, where the metal ion is selected from the group consisting of:
    metal ions chelated or complexed prior to adding;
    metal ions that are a component of organometallic complexes;
    metals in oxide, sulphate, or phosphate form;
    metal ions plated onto particle surfaces;
    metal ions dispersed within a matrix;
    metal ions distributed within a synthetic porous particle;
    encapsulated or pelletized metal ions; and
    metal ions attached to the surface of clays; and
    in the absence of an oxidizer breaker.

16. The method of claim 15 conducted in the absence of an enzyme breaker.

17. The method of claim 15 where in adding the polyol, the polyol is selected from the group consisting of mannitol, sorbitol, xylitol, glycerol, glucose, fructose, maltose, lactose, tagatose, psicose, galactose, xylose, allose, ribose, arabinose, rhamnose, mannose, altrose, ribopyranose, arabinopyranose, glucopyranose, gulopyranose, galatopyranose, psicopyranose, allofuranose, gulofuranose, galatofuranose, glucosamine, chondrosamine, galactosamine, ethylhexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof.

18. The method of claim 15 further comprising subjecting the polymer and the polyol to heat, where the temperature ranges from about 80 to about 250° F. (about to about 121° C.).

19. The method of claim 15 where in subjecting the polymer and the polyol to heat for an effective period of time, the period of time ranges from about 0.5 to about 48 hours.

20. The method of claim 15 where the metal of the metal ion is selected from the group consisting of molybdenum, manganese, iron, cobalt, copper, zinc, chromium, nickel, palladium, and combinations thereof.

21. The method of claim 15 where the metal ion concentration in the aqueous fluid ranges from about 0.01 to about 100.0 ppm.

22. The method of claim 15 where the metal ion is a component of an inorganic compound form.

23. An aqueous fluid comprising:
at least one polysaccharide gel;
at least one polvol;
at least one metal ion in an amount effective to catalyze at least one polyol, in an amount effective to eventually reduce the pH of the fluid and break down the polysaccharide backbone directly, where the metal ion is selected from the Periodic Table Groups VIB, VIIB, VIII, IB and IIB where the metal ion is selected from the group consisting of:
metal ions chelated or complexed prior to adding;
metal ions that are a component of organometallic complexes;
metals in oxide, sulphate, or phosphate form;
metal ions plated onto particle surfaces;
metal ions dispersed within a matrix;
metal ions distributed within a synthetic porous particle;
encapsulated or pelletized metal ions; and
metal ions attached to the surface of clays;
in the absence of an oxidizer breaker; and water.

24. The fluid of claim 23 where the polyol has at least one hydroxyl group on two adjacent carbon atoms and is selected from the group consisting of monosaccharides and disaccharides, and acid, acid salt, alcohol, alkyl and amine derivatives of these saccharides.

25. The fluid of claim 23 having an absence of an enzyme breaker.

26. The fluid of claim 23 further comprising a compound selected from the group consisting of an alkali metal hydroxide, an alkali metal carbonate, bicarbonate, sesquicarbonate, and mixtures thereof to raise the pH to at least 8.0.

27. The fluid of claim 23 where the polyol is selected from the group consisting of mannitol, sorbitol, xylitol, glycerol, glucose, fructose, maltose, lactose, tagatose, psicose, galactose, xylose, allose, ribose, arabinose, rhamnose, mannose, altrose, ribopyranose, arabinopyranose, glucopyranose, gulopyranose, galatopyranose, psicopyranose, allofuranose, g gulofuranose, galatofuranose, glucosamine, chondrosamine, galactosamine, ethyl-hexo glucoside, methyl-hexo glucoside, aldaric acid, sodium aldarate, glucaric acid, sodium glucarate, gluconic acid, sodium gluconate, glucoheptonic acid, sodium glucoheptonate, and mixtures thereof.

28. The fluid of claim 23 where the polyol is selected from the group consisting of fructose, glucose, lactose, maltose, sorbitol, or alkyl glucoside.

29. The fluid of claim 23 where the amount of polyol ranges from about 0.1 to about 30.0 pptg (about 0.012 to about 3.6 kg/m$^3$) based on the total volume of fluid.

30. The fluid of claim 23 where the amount of metal ion ranges from about 0.01 to about 100.0 ppm based on the total volume of fluid.

31. The fluid of claim 23 where the polysaccharide is crosslinked.

32. The fluid of claim 23 where the polysaccharide is crosslinked with an ion selected from the group consisting of borate ion, zirconate ion, titanate ion, and combinations thereof.

* * * * *